United States Patent
Li

(10) Patent No.: US 9,944,176 B2
(45) Date of Patent: Apr. 17, 2018

(54) ELECTRIC VEHICLE

(71) Applicants: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

(72) Inventor: Shufu Li, Hangzhou (CN)

(73) Assignees: Zhejiang Geely Holding Group Co., Ltd., Hangzhou (CN); Zhejiang Geely Automobile Research Institute Co., Ltd., Taizhou (CN)

( * ) Notice: Subject to any disclaimer, the term of this patent is extended or adjusted under 35 U.S.C. 154(b) by 0 days.

(21) Appl. No.: 15/123,112

(22) PCT Filed: Mar. 5, 2015

(86) PCT No.: PCT/CN2015/073712
§ 371 (c)(1),
(2) Date: Sep. 1, 2016

(87) PCT Pub. No.: WO2015/135435
PCT Pub. Date: Sep. 17, 2015

(65) Prior Publication Data
US 2017/0072792 A1  Mar. 16, 2017

(30) Foreign Application Priority Data
Mar. 10, 2014 (CN) .......................... 2014 1 0085492

(51) Int. Cl.
*B60K 17/22* (2006.01)
*B60K 17/356* (2006.01)
(Continued)

(52) U.S. Cl.
CPC .............. *B60K 17/22* (2013.01); *B60K 1/00* (2013.01); *B60K 1/02* (2013.01); *B60K 17/16* (2013.01);
(Continued)

(58) Field of Classification Search
CPC .... B60K 17/22; B60K 2001/001; B60K 1/02; B62D 61/10
See application file for complete search history.

(56) References Cited

U.S. PATENT DOCUMENTS 3,626,862 A    12/1971   Korn et al.
3,930,550 A *   1/1976   Rose ...................... B60G 11/23
                                             180/24.08
(Continued)

FOREIGN PATENT DOCUMENTS

CN      2526211 Y    12/2002
CN    101186180 A     5/2008
(Continued)

OTHER PUBLICATIONS

Extended European Search Report from corresponding European Patent Application No. 15762133.5 dated Feb. 6, 2017.
(Continued)

*Primary Examiner* — Brian L Swenson
(74) *Attorney, Agent, or Firm* — Alston & Bird LLP

(57) ABSTRACT

An electric vehicle including: a plurality of transmission shafts, wherein each transmission shaft is arranged along a lateral direction of the electric vehicle, the plurality of transmission shafts are spaced along the longitudinal direction of the electric vehicle, and each transmission shaft is used for driving wheels which are coaxially arranged and are located at opposite sides of the vehicle; at least two drive motors each of which is in transmission connection with at least one transmission shaft and is used for driving the at
(Continued)

least one transmission shaft; wherein, at least one of the at least two drive motors is a single-shaft drive motor which is in transmission connection with only one transmission shaft to drive the only one transmission shaft. The drive motors and the transmission shafts are modular so that the installation and control of the transmission shafts of the electric vehicle can be simplified.

9 Claims, 2 Drawing Sheets

(51) Int. Cl.
*B60K 1/00* (2006.01)
*B60K 1/02* (2006.01)
*B60K 17/16* (2006.01)
*B60L 15/20* (2006.01)

(52) U.S. Cl.
CPC .......... *B60K 17/356* (2013.01); *B60L 15/20* (2013.01); *B60K 2001/001* (2013.01); *B60L 2240/42* (2013.01)

(56) References Cited

U.S. PATENT DOCUMENTS

| | | | | |
|---|---|---|---|---|
| 4,270,622 A * | 6/1981 | Travis | ............ | B60K 1/02 180/65.285 |
| 6,488,110 B2 * | 12/2002 | Price | ............ | B60G 3/06 180/233 |
| 7,325,638 B1 * | 2/2008 | Belloso | ............ | B60K 5/08 180/14.2 |
| 7,464,779 B2 * | 12/2008 | Grabmaier | ............ | B60K 6/46 180/248 |
| 7,954,574 B2 * | 6/2011 | Schoon | ............ | B60K 1/02 180/6.48 |
| 8,376,068 B2 * | 2/2013 | Vargas | ............ | B60K 1/04 180/56 |
| 9,669,873 B2 * | 6/2017 | Buschjohann | ............ | B62D 21/02 |
| 2008/0190686 A1 | 8/2008 | Bald et al. | | |
| 2010/0006355 A1 * | 1/2010 | Smith | ............ | B60G 3/20 180/24 |
| 2011/0232984 A1 | 9/2011 | Wurm | | |

FOREIGN PATENT DOCUMENTS

| | | |
|---|---|---|
| CN | 201 257 897 Y | 6/2009 |
| CN | 201257897 Y | 6/2009 |
| CN | 201300703 Y | 9/2009 |
| CN | 102514482 A | 6/2012 |
| CN | 103552459 A | 2/2014 |
| DE | 20 2013 003847 U1 | 5/2013 |
| EP | 0 024 294 A1 | 3/1981 |
| JP | 2005-138824 A | 6/2005 |
| WO | WO 98/37614 A1 | 8/1998 |
| WO | WO 99/02358 A1 | 1/1999 |
| WO | WO 2006/108531 A2 | 10/2006 |
| WO | WO 2009/017533 A1 | 2/2009 |

OTHER PUBLICATIONS

Written Opinion of the International Searching Authority for Application No. PCT/CN2015/073712, together with English Translation, dated Mar. 5, 2015, 8 pages.

International Search Report of the International Searching Authority for Application No. PCT/CN2015/073712, dated Mar. 5, 2015.

* cited by examiner

ELECTRIC VEHICLE

FIELD OF THE INVENTION

The present invention relates to the field of automobiles, and in particular, to an electric vehicle.

BACKGROUND OF THE INVENTION

An existing electric vehicle usually has two transmission shafts, and each transmission shaft drives a pair of wheels located at opposite sides of the vehicle. All transmission shafts are controlled by one drive motor arranged at the front or rear of the vehicle. According to the number and the positions of the transmission shafts driven by the drive motor, the electric vehicle can realize front-wheel drive, rear-wheel drive or four-wheel drive.

For a vehicle with larger carrying capacity, for example, a large or heavy passenger car or truck, its chassis generally includes more transmission shafts, for example, four shafts, six shafts or eight shafts. The driving structure of such a vehicle is complex, and it is very difficult to realize the corresponding eight-wheel drive, twelve-wheel drive or sixteen-wheel drive. Moreover, due to the limit of the existing electric energy storage technology of the electric vehicle, when considering the necessary power demand and endurance mileage, such vehicle generally adopts a fuel engine as a direct power source, instead of being driven by the drive motor just like the electric vehicle.

SUMMARY OF THE INVENTION

An object of the present invention is to provide an electric vehicle, which is particularly suitable for electric vehicles with more transmission shafts. Another object of the present invention is to provide a modular installation assembly integrating a transmission shafts with a drive motor.

In particular, the present invention provides an electric vehicle including:
a plurality of transmission shafts, wherein each transmission shaft is arranged along a lateral direction of the electric vehicle, the plurality of transmission shafts are spaced along a longitudinal direction of the electric vehicle, and each transmission shaft is used for driving wheels which are coaxially arranged and are respectively located at two opposite sides of the vehicle;
at least two drive motors each of which is in transmission connection with at least one transmission shaft and is used for driving the at least one transmission shaft; and wherein, at least one of the at least two drive motors is a single-shaft drive motor which is in transmission connection with only one (or a single) transmission shaft to drive the only one transmission shaft.

Further, each of the at least two drive motors is the single-shaft drive motor.

Further, at least one of the at least two drive motors is a double-shaft drive motor which is in transmission connection with only two transmission shafts adjacent to each other to drive the only two adjacent transmission shafts.

Further, the double-shaft drive motor is arranged between the only two adjacent transmission shafts.

Further, one of the at least two drive motors is the double-shaft drive motor, and each of others of the at least two drive motors is the single-shaft drive motors.

Further, each single-shaft drive motor and the corresponding only one transmission shaft driven thereby together form a pre-assembled single-shaft drive module; and wherein the single-shaft drive module further includes a module holder for being detachably connected to a vehicle frame of the electric vehicle, and the single-shaft drive motor and the correspondingly only one transmission shaft driven thereby are held by the module holder so as to become an independent module that is integrally movable.

Further, the single-shaft drive module further includes a differential and/or a transmission held by the module holder.

Further, the electric vehicle further includes a controller configured to choose any number of drive motors in the at least two drive motors to work.

Further, the number of the plurality of transmission shafts is at least three or at least four.

The electric vehicle of the present invention includes a plurality of drive motors, and at least one drive motor therein is the single-shaft drive motor for driving a single transmission shaft. This is suitable for assembling the vehicle chassis in a modular mode, and it is convenient to expand the vehicle. According to the present invention, the driving mode of the vehicle may be accurately controlled with each single transmission shaft as a controlled unit. The present invention is particularly suitable for vehicles with a plurality of transmission shafts (for example, four or more transmission shafts), for example, large or heavy passenger cars, trucks, off-road vehicles, special-purpose vehicles, etc.

According to the detailed description of specific embodiments of the present invention below in combination with accompanying drawings, those skilled in the art can better understand the above and other objects, advantages and features of the present invention.

BRIEF DESCRIPTION OF THE DRAWINGS

Some specific embodiments of the present invention will be described below exemplarily rather than restrictively with reference to the accompanying drawings. Identical reference symbols in the accompanying drawings refer to identical or similar components or parts. Those skilled in the art should understand that these accompanying drawings are not necessarily drawn to scale. In the accompanying drawings.

DETAILED DESCRIPTION OF THE EMBODIMENTS

Figure 1:
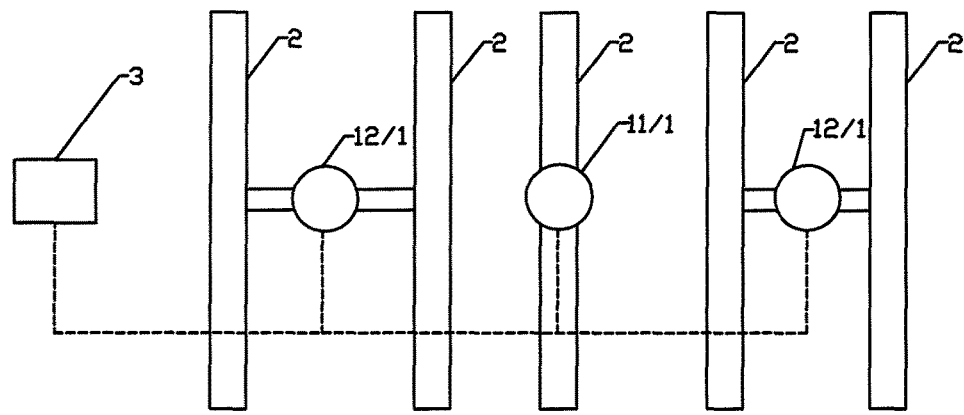
FIG. 1 is a schematic diagram of arrangement of transmission shafts and drive motors according to one embodiment of the present invention.
Figure 2:
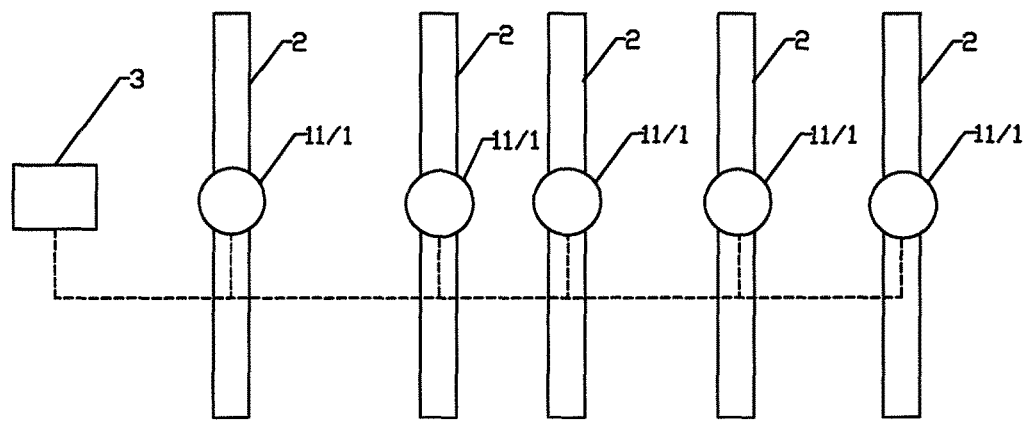
FIG. 2 is a schematic diagram of arrangement of transmission shafts and drive motors according to another embodiment of the present invention.
Figure 3:
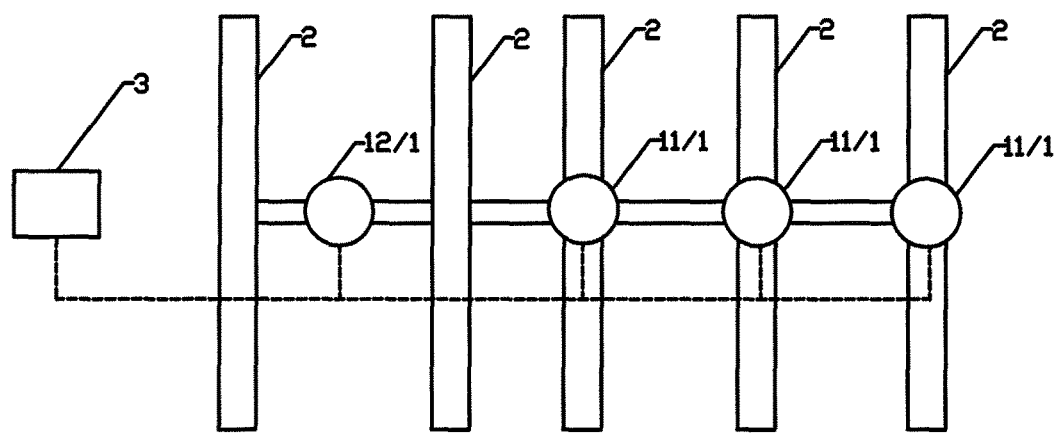
FIG. 3 is a schematic diagram of arrangement of transmission shafts and drive motors according to yet another embodiment of the present invention.

Refer to FIG. 1 to FIG. 3, in the present application, an electric vehicle may include a plurality of transmission shafts 2, each transmission shaft 2 is arranged along the lateral direction (the up and down direction of the sheet) of the electric vehicle, and the plurality of transmission shafts are spaced along the longitudinal direction (the left and right direction of the sheet) of the electric vehicle. The spacing distance between adjacent transmission shafts 2 may be set according to the design demand of the vehicle. Each transmission shaft 2 is generally used for driving wheels (not shown) which are coaxially arranged and are located at opposite sides of the vehicle. The electric vehicle may further include a plurality of drive motors 1, each drive motor 1 is in transmission connection with at least one transmission shaft 2 and is used for driving the corresponding transmission shafts 2. According to the number of the transmission shafts 2 driven by the drive motor 1, the drive motor 1 may be a single-shaft drive motor 11 or a double-shaft drive motor 12. The single-shaft drive motor 11 is in transmission connection with only one transmission shaft 2 to drive the single transmission shaft 2. The double-shaft drive motor 12 is in transmission connection with two adjacent transmission shafts 2 to drive the two adjacent transmission shafts 2. The double-shaft drive motor 12 is preferably arranged between the two adjacent transmission shafts 2 driven by the same. In other embodiments not shown, the drive motor 1 may also be a multi-shaft drive motor for driving more such as three or more than three transmission shafts 2. It should be particularly noted that, in the present invention, at least one of the plurality of drive motors 1 of the electric vehicle is the single-shaft drive motor 11.

FIG. 1 is a schematic diagram of arrangement of transmission shafts and drive motors according to one embodiment of the present invention, and the electric vehicle includes five transmission shafts 2. Specifically, according to a direction from left to right, the first and second transmission shafts 2 are driven by one double-shaft drive motor 12 therebetween, the third transmission shaft 2 is driven by one single-shaft drive motor 11, and the fourth and fifth transmission shafts 2 are driven by one double-shaft drive motor 12 therebetween. In the embodiment as shown in FIG. 2, the five transmission shafts 2 of the electric vehicle are respectively driven by the corresponding single-shaft drive motors 11. In the embodiment as shown in FIG. 3, the first and second transmission shafts 2 are driven by one double-shaft drive motor 12 therebetween, and the remaining third to fifth transmission shafts 2 are respectively driven by the corresponding single-shaft drive motors 11.

In other embodiments not shown, the electric vehicle may also have more or less transmission shafts. In one embodiment, the electric vehicle may have two transmission shafts, and each transmission shaft is respectively driven by one corresponding single-shaft drive motor 11. In another embodiment, the electric vehicle may have three or four transmission shafts, and each transmission shaft may be respectively driven by one corresponding single-shaft drive motor 11; or a pair of adjacent transmission shafts is driven by one double-shaft drive motor 12 therebetween, and each of the other transmission shafts is respectively driven by one corresponding single-shaft drive motor 11. In yet another embodiment, the electric vehicle may have six or more transmission shafts, and each transmission shaft may be respectively driven by a corresponding single-shaft drive motor 11; or one or two pairs of adjacent transmission shafts are respectively driven by the corresponding double-shaft drive motors 12 between the adjacent transmission shafts, and each of the remaining transmission shafts is respectively driven by one corresponding single-shaft drive motor 11.

It can be understood that, since two transmission shafts are generally the lowest configuration of the vehicle, with respect to the electric vehicle having three or more transmission shafts, two transmission shafts therein may be driven in a conventional mode, or the two transmission shafts may be driven, according to the mode of the present invention, by arranging one drive motor between the two adjacent transmission shafts, and each of the remaining transmission shafts may be driven by the single-shaft drive motor 11 in a manner of single-shaft drive module described below. Of course, with respect to the electric vehicle having three or more transmission shafts, the transmission shafts may also be respectively driven by the corresponding single-shaft drive motors 11. And even with respect to the electric vehicle having only two transmission shafts, the transmission shafts may also be respectively driven by the corresponding single-shaft drive motors 11.

In the above embodiments, the work of the drive motors 1 may be selected and controlled by a controller 3 of the electric vehicle. Dotted lines in FIG. 1 to FIG. 3 indicate control lines used by the controller 3 for controlling the work of the individual drive motors 1. The controller 3 may select a preset number of drive motors in the plurality of drive motors 1 to work according to the instruction of an operator, or the controller 3 may automatically designate and control the work of the drive motors 1 according to the power demand of the moving vehicle. In this way, for example, with respect to the electric vehicle as shown in FIG. 2, the driving mode can be adjusted between two-wheel drive and ten-wheel drive.

It can be seen from the above embodiments that, in the present invention, at least one of the plurality of drive motors of the electric vehicle is the single-shaft drive motor 11. Such arrangement is particularly suitable for the modular manufacturing of the vehicle by means of the single-shaft drive module described below.

Figure 4:
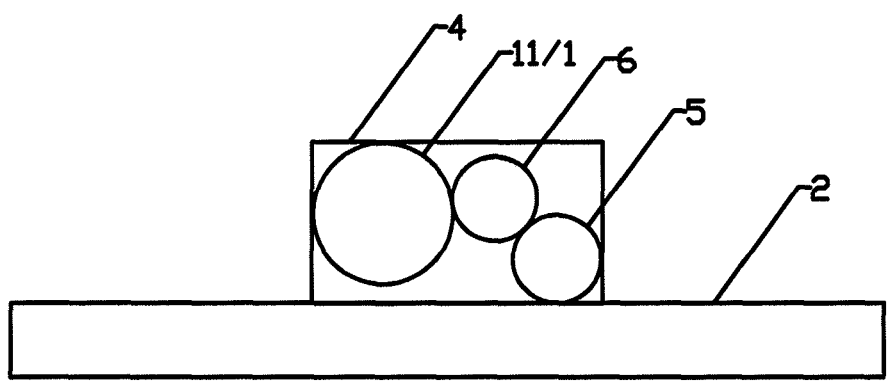
FIG. 4 is a schematic structure diagram of a single-shaft drive module composed of a single-shaft drive motor and a transmission shaft driven by the same as shown in FIG. 1 to FIG. 3.

FIG. 4 is a schematic diagram of structure of a single-shaft drive module composed of one single-shaft drive motor 11 and one transmission shaft driven by the same as shown in FIG. 1 to FIG. 3. In one embodiment of the present application, in order to conveniently install the transmission shaft 2 and the drive motor 1 and to form a stable connection structure therebetween in advance, each single-shaft drive motor 11 and the corresponding single transmission shaft 2 driven thereby together forms a pre-assembled single-shaft drive module. That is, one single-shaft drive motor 11 is fixed together with one transmission shaft 2 in advance to form one assembly, thereby simplifying the subsequent steps of assembling and installing it onto the electric vehicles. As shown in FIG. 4, the single-shaft drive module includes a module holder 4 for being detachably connected to the vehicle frame of the electric vehicle, and the single-shaft drive motor 11 and the correspondingly single transmission shaft 2 driven thereby are held by the module holder 4 so as to become an independent module that is integrally movable. During installation, the transmission shaft 2 and the drive motor 1 therewith may be simultaneously installed as a whole onto the vehicle frame of the electric vehicle by means of the module holder 4, thereby realizing the installation synchronism and stability of the transmission shaft 2 and the drive motor 1. In the single-shaft drive module, other components necessary for the single-shaft drive motor 11 to drive the transmission shaft 2 may also be added, for example, a differential 6 and/or a transmission 5 or the like. The transmission connection mode among the single-shaft drive motor 11, the transmission shaft 2 and the differential 6 and/or the transmission 5 is well known to those skilled in the art, and will not be repeated redundantly herein.

The applicant of the application proposes a power system of a serial hybrid power vehicle in Chinese Patent Application No. 201310467918.2. In the electric vehicle of the present invention, the power system in the previous application may be preferably used as the power source of the drive motors in the present invention.

It should be further noted that, under the principle that at least one of the plurality of drive motors according to the present invention is the single-shaft drive motor, the use of a multi-shaft drive motor for driving three or more transmission shafts is not excluded. In an exemplary embodiment not shown, with respect to the vehicle having five transmission shafts in FIG. 1 to FIG. 3, the first to third transmission shafts may be driven by a multi-shaft drive motor, and the fourth and the fifth transmission shafts are respectively driven by the corresponding single-shaft drive motors. However, considering the various driving modes and the modular manufacturing mode of the vehicle mentioned above, the electric vehicle according to the present invention should choose the single-shaft drive motor as much as possible, particularly the single-shaft drive module; while under certain circumstances, for example, considering the lowest configuration of the vehicle as mentioned above, a certain number of double-shaft drive motors may be adopted.

So far, those skilled in the art should recognize that, although a plurality of exemplary embodiments of the present invention have been shown and described in detail herein, however, many other variations or modifications conforming to the principle of the present invention can still be directly determined or deduced according to the contents disclosed in the present invention, without departing from the spirit or scope of the present invention. Therefore, the scope of the present invention should be understood and defined as encompassing all these variations or modifications.

The invention claimed is:

1. An electric vehicle, comprising:
   a plurality of transmission shafts, wherein each transmission shaft is arranged along a lateral direction of the electric vehicle, the plurality of transmission shafts are spaced to each other along a longitudinal direction of the electric vehicle, and each transmission shaft is used for driving corresponding wheels which are coaxially arranged and are respectively located at opposite sides of the vehicle; and
   at least two drive motors each of which is in transmission connection with at least one of the plurality of transmission shafts and is used for driving the at least one transmission shaft;
   wherein, at least one of the at least two drive motors is a single-shaft drive motor which is in transmission connection with only one transmission shaft to drive the only one transmission shaft, each single-shaft drive motor and the corresponding only one transmission shaft driven thereby together form a pre-assembled single-shaft drive module; and
   the single-shaft drive module further comprises a module holder for being detachably connected to a vehicle frame of the electric vehicle, and the single-shaft drive motor and the corresponding only one transmission shaft driven thereby are held by the module holder so as to become an independent module being integrally movable.

2. The electric vehicle of claim 1, wherein each of the at least two drive motors is the single-shaft drive motor.

3. The electric vehicle of claim 1, wherein at least one of the at least two drive motors is a double-shaft drive motor which is in transmission connection with only two adjacent transmission shafts to drive the only two adjacent transmission shafts.

4. The electric vehicle of claim 3, wherein the double-shaft drive motor is arranged between the only two adjacent transmission shafts.

5. The electric vehicle of claim 3, wherein one of the at least two drive motors is the double-shaft drive motor, and each of the remaining drive motors is the single-shaft drive motors.

6. The electric vehicle of claim 1, wherein the single-shaft drive module further comprises a differential and/or a transmission held by the module holder.

7. The electric vehicle of claim 1, further comprising:
   a controller configured to designate a preset number of drive motors in the at least two drive motors to work according to an instruction or automatically according to a power demand.

8. The electric vehicle of claim 1, wherein the number of the plurality of transmission shafts is at least three.

9. The electric vehicle of claim 1, wherein the number of the plurality of transmission shafts is at least four.

* * * * *